United States Patent [19]

Tesch

[11] 4,086,394

[45] Apr. 25, 1978

[54] COMBINATION OF A BATTERY AND VENT STRUCTURE

[75] Inventor: Hugo W. Tesch, Villa Park, Calif.

[73] Assignee: Elpower Corporation, Santa Ana, Calif.

[21] Appl. No.: 725,971

[22] Filed: Sep. 23, 1976

[51] Int. Cl.² .............................. H01M 2/12
[52] U.S. Cl. ........................ 429/54; 55/385 C; 55/417; 220/374
[58] Field of Search ............ 55/309, 310, 385 C, 55/411, 412, 415, 417; 220/367, 373, 374; 429/53–55; 137/853, 854

[56] References Cited

U.S. PATENT DOCUMENTS

| | | | |
|---|---|---|---|
| 3,257,237 | 6/1966 | Jache | 429/54 |
| 3,386,470 | 6/1968 | Goda et al. | 137/853 |
| 3,706,617 | 12/1972 | Stark | 429/54 |
| 3,861,557 | 1/1975 | Tupper | 220/373 |

FOREIGN PATENT DOCUMENTS

826,926  11/1951  Germany ..................... 137/854

*Primary Examiner*—Frank W. Lutter
*Assistant Examiner*—David L. Lacey
*Attorney, Agent, or Firm*—Edward D. O'Brian

[57] ABSTRACT

A vent structure intended for use in venting gas from the interior of a battery housing can be constructed so as to use a generally cup-shaped, resilient valve element. The element is positioned within a cavity at the top of the housing with the bottom of the element spaced from an opening in the bottom of the cavity and with the peripheral wall of the element resiliently engaging the interior of the cavity. A retainer extends across the open top of the cavity and engages the bottom of the valve element so as to hold it in place. The retainer holds the valve element so that the peripheral wall of the valve element can flex inwardly to permit the escape of gas. The vent structure is utilized with a gas-liquid separator placing the opening in the bottom of the cavity in communication with the interior of the housing. The cavity and the gas liquid separator are shaped so as to permit liquid to drain back into the interior of the housing from within the interiors of the cavity and the gas-liquid separator.

6 Claims, 4 Drawing Figures

U.S. Patent  April 25, 1978  4,086,394
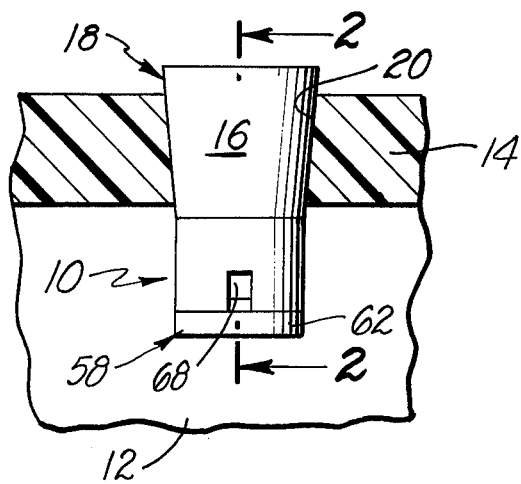
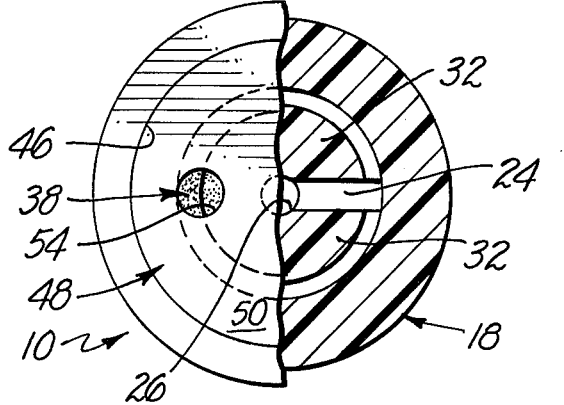
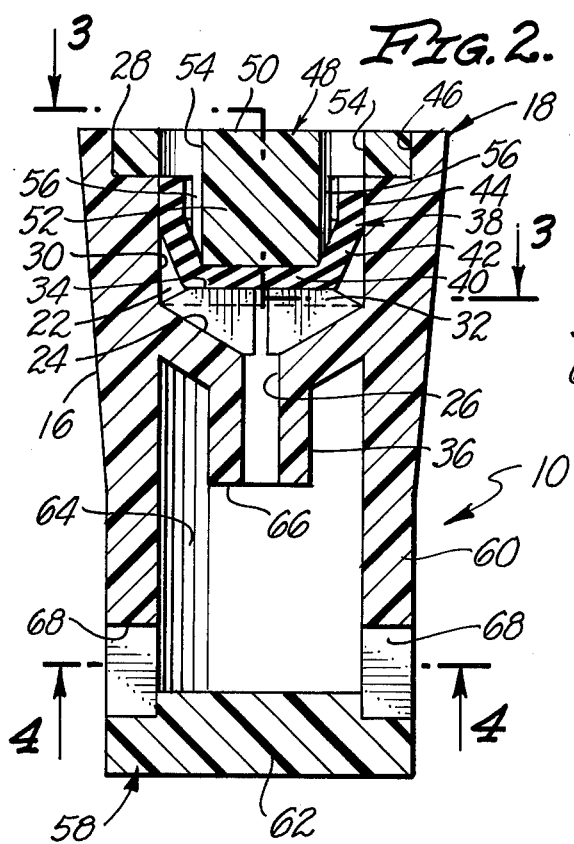
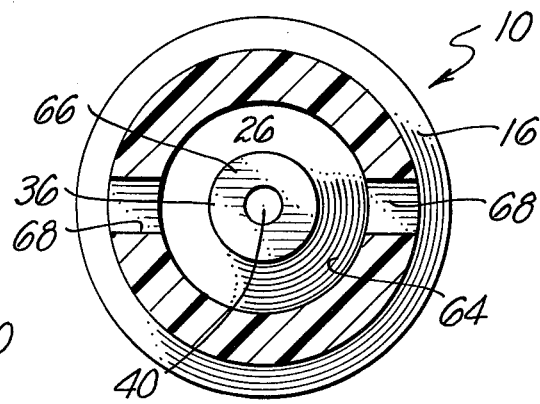

COMBINATION OF A BATTERY AND VENT STRUCTURE

BACKGROUND OF THE INVENTION

The invention set forth in this specification pertains to new and improved vent structures and more specifically to vent structures which are intended to be utilized in venting batteries such as lead acid batteries.

It has long been recognized that gas is given off within the interiors of such batteries during the utilization of such batteries. As a result of the desire to utilize enclosed housings for such batteries a number of different types of vent structures have been developed for the purpose of releasing such gas to the atmosphere so as to avoid a build-up of internal gas pressure which might cause rupture of a housing. Fortunately an understanding of the present invention does not require a detailed consideration of the many different vent structures which have previously been proposed, constructed and/or used.

It is considered that none of such structures have been of a completely desirable character. Certain of such structures have been relatively undesirable because of their cost. In the battery field economy of construction is important. However, it is considered that the vast majority of such vent structures have been undesirable because of certain problems associated with their operation. Any structure as noted must be reliable in the sense that it will reliably release any gas within the interior of a housing so as to prevent a build-up of such gas within the housing.

In addition, any such structure must effectively prevent any escape of electrolyte from within the interior of the housing in order to be acceptable. It is believed that the reason for the latter is essentially self-evident. The usual electrolyte used in a battery is rather corrosive. If such electrolyte should escape from a battery either as a battery is used and/or as a battery is being handled during shipment or the like there would be a significant danger of damage.

BRIEF SUMMARY OF THE INVENTION

It is believed that it will be apparent from the preceding that it is considered that there is a need for new and improved vent structures which are primarily intended to be utilized in conjunction with battery housings. It is to be understood, however, that the vent structures of the present invention are not restricted to such utilization and can be employed wherever it is needed to vent a gas from the interior of a structure so as to prevent an accumulation of the gas within the structure.

Further objects of the invention are to provide vent structures as indicated which are comparatively inexpensive to manufacture, which are rather simple to install in a housing and which are capable of performing reliably over a comparatively prolonged period. The latter is considered to be particularly important and significant. Another objective of the invention is to provide vent structures which do an effective job of separating gas from electrolyte in a battery so as to minimize the possibility of electrolyte escaping from the battery.

In accordance with this invention these objectives are achieved in the combination of a housing and a vent for allowing escape of gas from the housing located adjacent to the top of the housing by providing the improvement which comprises: the vent including a receptacle, a valve element and a retainer; the receptacle including an internal cavity having a sloping bottom surrounded by an internal peripheral surface which extends upwardly from the periphery of the bottom, an open top; and an opening leading downwardly from the lowermost part of the bottom surface through the bottom of the receptacle; the valve element being formed of a resilient elastomeric material so as to have a bottom wall and a peripheral wall attached to the periphery of the bottom wall so as to extend upwardly therefrom, the valve element being located within the cavity with the peripheral wall extending upwardly from the bottom wall in resilient engagement with the peripheral surface; the retainer including a holder for attaching the retainer to the receptacle so that the retainer extends generally above the valve element and across the cavity, a holding member attached to the holder and extending downwardly from the holder into engagement with the bottom wall so as to hold the bottom wall in position and at least one vent opening extending through the holder, the holding member being shaped so as to permit the peripheral wall to be flexed inwardly away from the peripheral surface in response to internal gas pressure so as to permit gas to move around the peripheral wall of the valve element to the vent opening.

BRIEF DESCRIPTION OF THE DRAWING

Because of the nature of the invention it is best more fully described with reference to the accompanying drawing in which:

FIG. 1 is a view showing a presently preferred embodiment or form of a vent structure in accordance with this invention installed in the top of a battery housing. In this view the vent structure is shown in elevation and the top of the housing is shown in section;

FIG. 2 is a cross-sectional view at an enlarged scale taken at line 2—2 of FIG. 1;

FIG. 3 is a partial cross-sectional view taken at line 3—3 of FIG. 2 in which a part of the top of the vent structure is shown in elevation; and FIG. 4 is a cross-sectional view taken at line 4—4 of FIG. 2.

The specific vent structure illustrated has been designed and constructed so as to utilize certain operative concepts or principles as are set forth in the claims appended to this specification. It will be realized that these concepts or principles can be applied to a variety of somewhat differently appearing and somewhat differently constructed vent structures through the use or exercise of routine design skill in the battery vent field.

DETAILED DESCRIPTION

In the drawing there is shown a vent structure 10 in accordance with the invention utilized in connection with a conventional enclosed housing 12, such as a battery housing having a top 14. This vent structure 10 is provided with a tapered external surface 16 on a rigid receptacle or top half 18 of this vent structure 10. This tapered surface 16 is used so that the vent structure 10 may be conveniently and easily assembled in an operative position with respect to a correspondingly shaped opening 20 in the top 14 of the housing 12. The surface 16 may be press fitted within this opening 20 so as to be held in place by friction. However, it is preferred to seal the receptacle 18 to the top 14 through the use of a conventional adhesive (not shown).

The receptacle 18 of the vent structure 10 is shaped so as to include an internal cavity 22 having a sloping bottom 24 leading downwardly to an opening 26 extending out of the receptacle 18. This cavity 22 also includes an open top 28 and an internal cylindrical peripheral surface 30 leading from the periphery (not separately numbered) of the bottom 24 toward the top 28. A plurality of supports 32 serving as support means are located on the bottom 24 so as to project upwardly into the cavity 22. These supports 32 extend on the bottom 24 in a radial manner so as not to interfere with liquid draining into the opening 26. These supports 32 are also provided with flat upper surfaces 34 serving a function as hereinafter described. A tubular extension 36 is formed on the receptacle 18 so as to lead downwardly from the opening 26. In effect the bottom 24 and the extension 36 appear much as a common funnel leading downwardly from the receptacle 18.

The vent structure 10 also includes a valve element 38 formed out of a conventional resilient, elastomeric material so as to include a bottom wall 40 having a beveled wall 42 attached to its periphery and extending upwardly therefrom so as to connect the bottom wall 40 with a cylindrical peripheral wall 44. This bottom wall 40 fits against the surfaces 34 so as to be spaced from the bottom 24. The peripheral wall 44 is dimensioned so as to resiliently engage the surface 30. In the vent structure 10 this peripheral wall 44 is of such a height as to terminate adjacent to a flange-like groove 46 formed in the receptacle 18.

A retainer 48 having a disk-like holder 50 is located so that this holder 50 is secured within the groove 46. Although the holder 50 may be attached in position by friction it is preferred to secure it in the location shown through the use of a conventional adhesive (not shown). This holder 50 carries a centrally located plug-like holding member 52 which extends downwardly from it into engagement with the bottom wall 40 so as to secure the valve element 38 in the position shown.

This holding member 52 is of smaller diameter than the peripheral wall 44 so as to permit this peripheral wall 44 to flex inwardly in response to gas pressure within the cavity 22 in such a manner as to permit gas to escape through a vent opening 54 in the retainer 48. The vent opening 54 is formed in the holder 50; if desired, a groove 56 may be provided in the holding member 52 as essentially an extension of the vent opening 54 to facilitate inward movement of the peripheral wall 44 as gas is escaping from the vent structure 10. At least one vent opening 54 as noted must be used. It is preferred, however, to utilize a plurality of such vent openings 52 in order to prevent the build-up of gas generally between the retainer 48 and the valve element 38.

The vent structure 10 is preferably utilized with a gas-liquid separator 58 which is constructed so as to appear essentially as an extension of the receptacle 18 and so as to utilize the bottom 24 of the receptacle 18 as a part of the separator 58 and so as to utilize the tubular extension 36 as a part of the separator. This separator 58 includes a nearly cylindrical wall 60 appearing as an extension of the exterior of the receptacle 18 and a bottom wall 62 closing off the end of the wall 60 remote from the receptacle 18. The bottom 24, the wall 60 and the bottom wall 62 define an internal chamber 64 which surrounds the extension 36 so that the bottom 66 of this extension 36 is spaced midway between the top and the bottom of this chamber 64. At least one and preferably two openings 68 are provided in the wall 60 adjacent to the bottom wall 62.

During the use of the vent structure 10 gas and frequently a mixture of gas and entrained fluid such as electrolyte will enter the openings 68 and into the chamber 64 of the gas-liquid separator 58. Because of the shapes of the various parts of this gas-liquid separator 58 there will be a very strong tendency for any such fluid to be separated from the gas present so as to tend to drain from the chamber 64 through the opening 68. Gas will pass from this chamber 64 through the extension 36 into the cavity 22.

If any liquid should still be entrained with such gas the shape of the bottom 24 will enable such liquid to drain back into the chamber 64 as it is separated from the gas by fluid movement within the cavity 22. The gas remaining will, of course, tend to flex the peripheral wall 44 inwardly in response to internal pressure within the housing 12 so as to permit the wall 44 to act as a valve allowing such gas to escape. The use of the beveled wall 42 is considered to facilitate such gas pressure caused flexure. It is considered obvious that the inherent resiliency of the material used to form the valve element 38 will cause the peripheral wall 44 to resume its initial configuration so as to seal off the interior of the housing 12 after internal gas pressure has been relieved in the manner noted. If desired the valve element 38 may be considered as an operative part of a check valve structure.

It is believed that it will be apparent from the preceding that the vent structure 10 is a very simple structure which can be manufactured at a comparatively nominal cost. This structure 10 is considered to be very reliable for its intended use which will adequately and satisfactorily perform its intended function for a prolonged period.

I claim:

1. In the combination of a battery including a housing, and a vent for allowing the escape of gas from the interior of said housing, said vent being located adjacent to the top of said housing, the improvement which comprises:

said vent including a receptacle, a valve element and a retainer, said receptacle being formed of a rigid material so as to include an internal cavity having a sloping bottom surrounded by an internal peripheral surface which extends upwardly from the periphery of said bottom, an open top, an opening extending through the lowermost part of said bottom downwardly through the bottom of said receptacle, a plurality of ribs extending upwardly from said bottom, said ribs being radially positioned on said bottom so as not to interfere with drainage into said opening and having their tops located within a common plane, said valve element being formed of a resilient, elastomeric material so as to have a bottom wall and a peripheral wall attached to the periphery of said bottom wall so as to extend upwardly from said bottom wall, said valve element being located within said cavity with said bottom wall of said valve element being positioned against said upper surfaces of said ribs, and with said peripheral wall extending upwardly from said bottom wall into resilient engagement with said peripheral surface, said retainer including a holder for attaching said retainer to said receptacle so that said retainer extends generally above said valve element and across said cavity, a holding member attached to said holder and extending downwardly from said holder into engagement with substantially all of said bottom wall of said valve element so as to hold said bottom wall of said valve element in position against said ribs, and at least one vent opening extending through said holder, said holding member being shaped so as to permit said peripheral wall to be flexed inwardly away from said peripheral surface in response to internal gas pressure within said housing so as to permit gas to move from around said valve element through said vent opening.

2. The combination claimed in claim 1 wherein:
said valve element includes a beveled wall extending from the periphery of said bottom wall and connecting said bottom wall to said peripheral wall, said beveled wall being spaced from said peripheral surface.

3. The combination claimed in claim 1 including:
gas-liquid separating means for minimizing the entrainment of liquid by any gas passing through said opening in said receptacle into said cavity located within said receptacle in communication with said opening in said receptacle.

4. The combination claimed in claim 3 wherein:
said gas-liquid separating means comprises means defining a chamber located beneath said receptacle, said chamber being in communication with said opening, said chamber including at least one hole connecting the interior of said chamber with the interior of said housing adjacent to the bottom of said chamber.

5. The combination claimed in claim 4 wherein:
the bottom of said receptacle has a funnel-like shape, said bottom of said receptacle including a tubular extension leading downwardly therefrom and extending into the interior of said chamber between the top and the bottom thereof.

6. The combination claimed in claim 1 wherein:
said valve element includes a beveled wall extending from the periphery of said bottom wall and connecting said bottom wall to said peripheral wall, said beveled wall being spaced from said peripheral surface, and including gas-liquid separating means for minimizing the entrainment of liquid by any gas passing through said opening in said receptacle into said cavity located within said receptacle in communication with said opening in said receptacle, and wherein said gas-liquid separating means comprises means defining a chamber located beneath said receptacle, said chamber being in communication with said opening, said chamber including at least one hole connecting the interior of said chamber with the interior of said housing adjacent to the bottom of said chamber, the bottom of said receptacle has a funnel-like shape, said bottom including a tubular extension leading downwardly therefrom extending into the interior of said chamber between the top and the bottom thereof.

* * * * *